Aug. 14, 1951     A. BJORKLUND     2,564,352
LAWN SWEEPER AND LEAF DISINTEGRATOR
Filed March 22, 1948     3 Sheets-Sheet 1
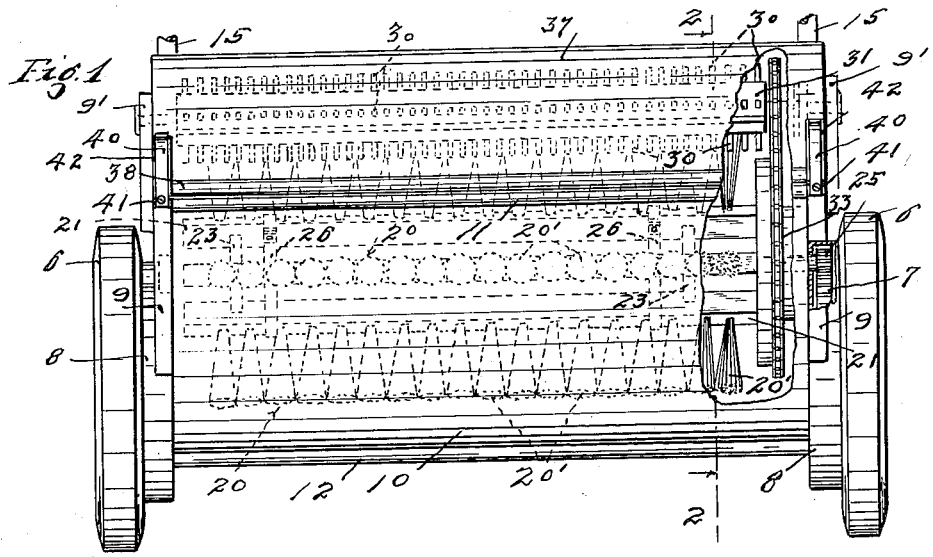
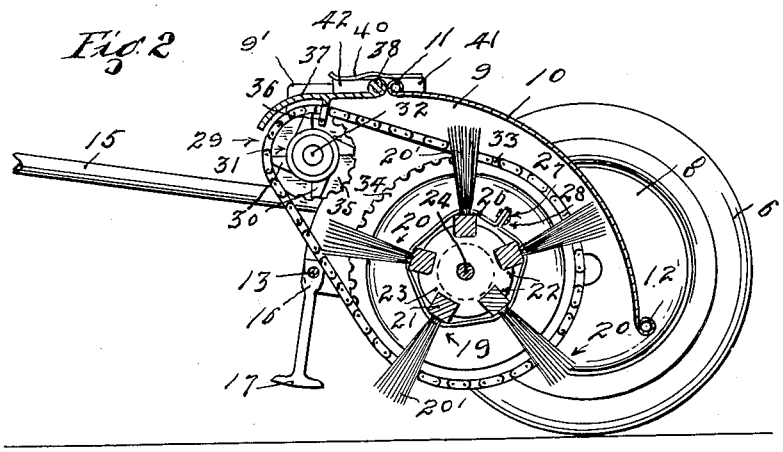
INVENTOR.
Arvid Bjorklund
BY Harry D. Kilgore
Attorney

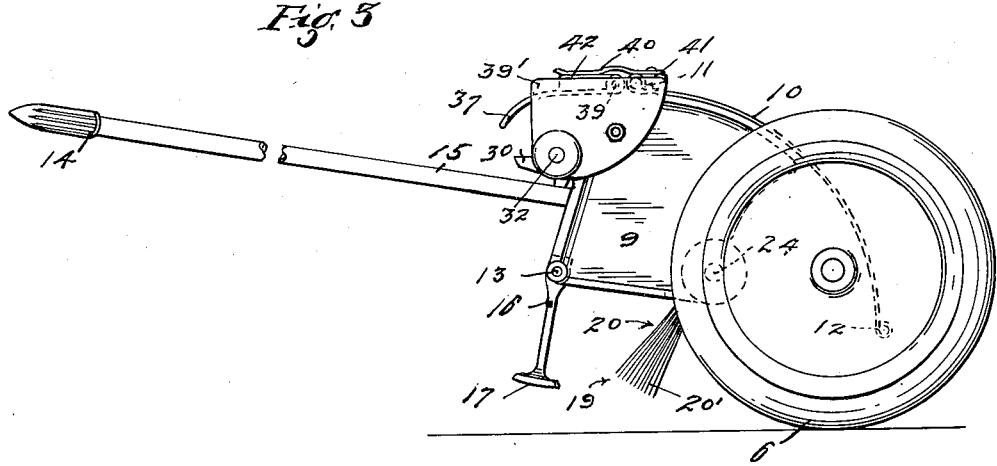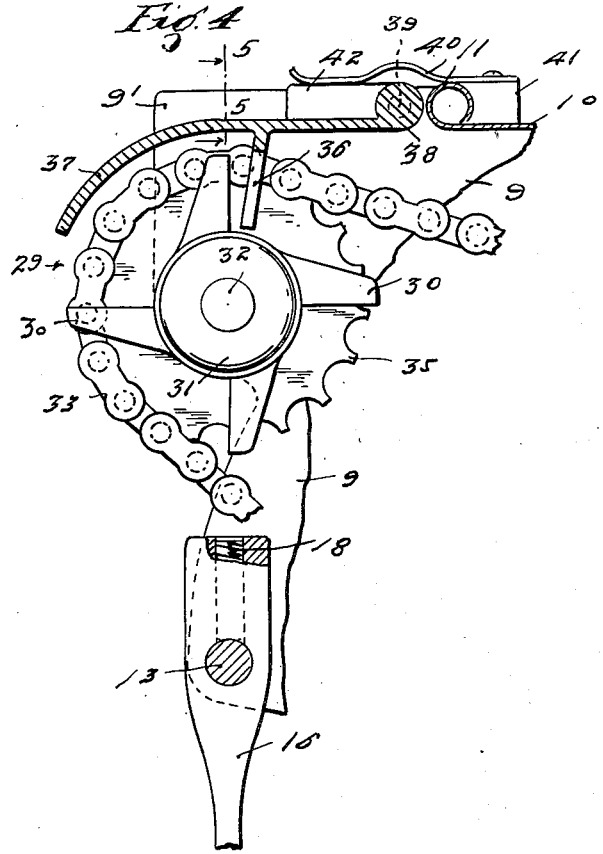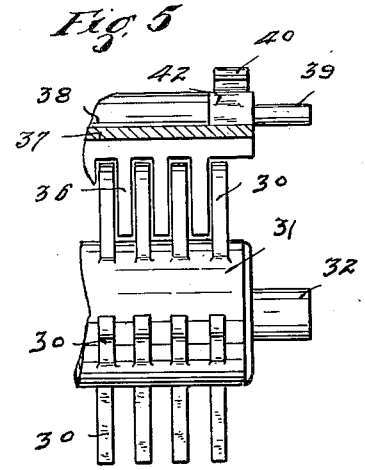

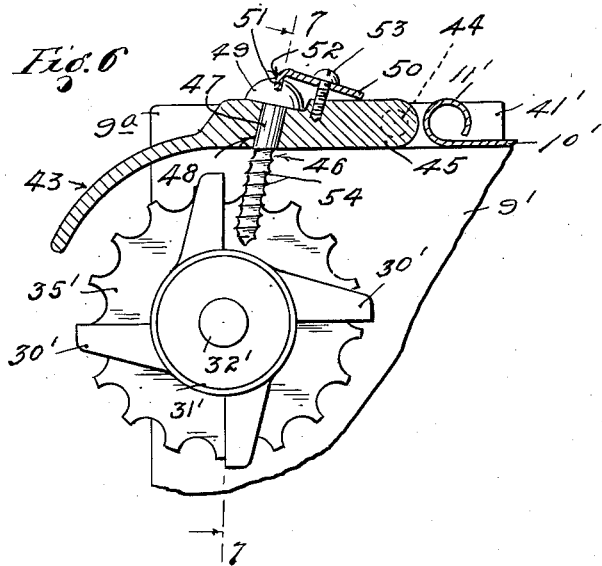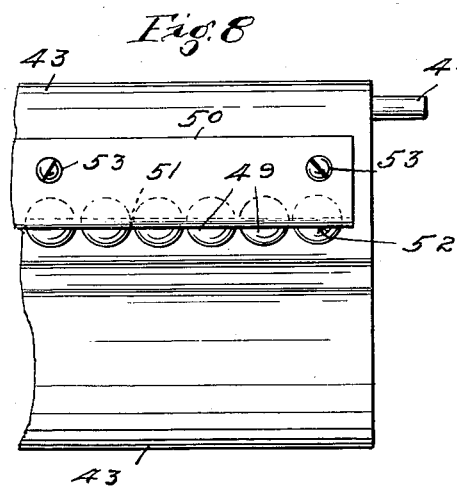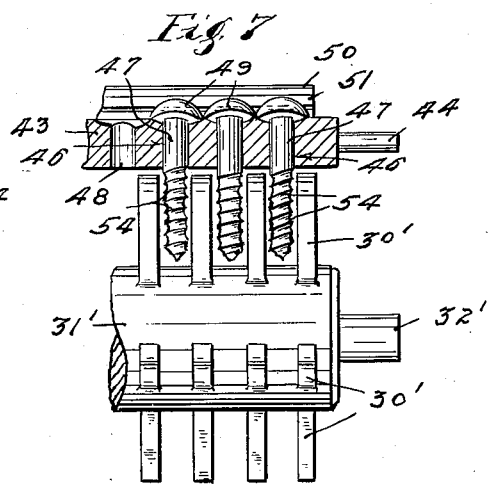

Patented Aug. 14, 1951

2,564,352

UNITED STATES PATENT OFFICE 2,564,352

LAWN SWEEPER AND LEAF DISINTEGRATOR

Arvid Bjorklund, Minneapolis, Minn.

Application March 22, 1948, Serial No. 16,303

3 Claims. (Cl. 55—118)

My present invention relates to a highly efficient lawn sweeper and leaf disintegrator.

It is now the general practice to rake fallen leaves on a lawn into piles, carry the same to the street and burn the same (which in some cities is forbidden by law), or to have the same carted away and then it is always a question where to pile the same in the meantime. It is well known that leaves, when reduced to a finely divided state, afford a mulch for a lawn to conserve moisture, and later, when decomposed, produce a highly beneficial fertilizer.

The principal object of this invention is to provide a lawn sweeper that delivers leaves with a sweeping action to a leaf disintegrator which, in turn, reduces the same to a finely divided state and redeposits the same on the lawn.

A further object of this invention is to provide a leaf disintegrator which will yield under undue pressure by twigs, sticks, stones or other hard and tough objects therein and pass the same to prevent extreme strain on or breakage thereof.

Still a further object of this invention is to provide a device which is of sturdy construction, easy to operate and which will sweep a lawn and disintegrate the leaves and redeposit the same on the lawn without giving the wind a chance to blow the same away from the device.

Other objects of this invention will be apparent from the following description and the accompanying drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a plan view of the invention with some parts broken away and other parts sectioned;

Fig. 2 is a view partly in side elevation and partly in transverse vertical section taken on the line 2—2 of Fig. 1;

Fig. 3 is a right-hand side elevational view of the invention;

Fig. 4 is a fragmentary detail view, on an enlarged scale, of the leaf disintegrator partly in end elevation and partly in longitudinal vertical section;

Fig. 5 is a fragmentary detail view partly in side elevation and partly in section taken on the line 5—5 of Fig. 4;

Fig. 6 is a fragmentary detail view, on an enlarged scale showing a modification of the leaf disintegrator partly in end elevation and partly in longitudinal vertical section;

Fig. 7 is a view partly in side elevation and partly in section taken on the line 7—7 of Fig. 6; and Fig. 8 is a fragmentary plan view of the parts shown in Fig. 6.

Referring first in detail to the invention shown in Figs. 1 to 5, inclusive, the numeral 6 indicates a pair of traction wheels of the lawn mower type having large spur gears 7, only a fragment of one of which is shown in Fig. 1, in gear housings 8 to which said wheels are journaled.

A pair of side frames 9 are rigidly secured to the gear housings 8 and connected by a sheet metal cover 10 that curves from the rear end portions of said frames, forwardly and downwardly. The rear edge portion of the cover 10 is rolled to tubular form, as indicated at 11, to reinforce the same and the lower edge portion of said cover is rolled about a crosstie rod 12 connecting the side frames 9. The side frames 9 are connected, at their rear lower corner portions, by a crosstie rod 13. A handle 14, by which the device is operated, includes a pair of side members 15 rigidly secured to the side frames 9. The device is supported, when not in use, by a leg 16 pivoted on the crosstie rod 13 at its longitudinal center and has on its lower end a ground-engaging foot 17. A set screw 18, having threaded engagement with the upper end portion of the leg 16, impinges the crosstie rod 13 and holds said leg where adjusted on the crosstie rod 13.

A rotary lawn sweeper 19 includes a plurality of circumferentially spaced brushes 20, each comprising a row of tufts of stiff bristles 20' secured to backs 21, each of which, as shown, is a long square bar. These backs 21 are mounted in open seats 22 in a pair of disk-like hubs 23 on a transverse shaft 24 journaled at its end portions in the side frames 9. This shaft 24 is driven from the traction wheels 6 by pinions 25 thereon that mesh with the gears 7, one of which is shown in Fig. 1. The backs 21 are held in the seats 22 by a pair of clamping bands 26 that encircle all of said backs close to the hubs 23. The end portions of each clamping band 26 are turned outwardly to afford a pair of ears 27 connected by stove bolts 28. The sweeper 19 is driven in the direction of the arrow marked on Fig. 2.

A leaf disintegrator 29 includes a rotor having a plurality of circumferentially spaced rows of teeth 30, as shown 4, on a roll 31 provided on its ends with trunnions 32 journaled in casings 9' on the side frames 9. The teeth 30 are rectangular in cross-section and the backs thereof are, as shown, in a radial plane that extends from the axis of the roll 31 and the fronts thereof are substantially tangential to the periphery of said roll, see Fig. 4. The roll 31 is driven from the sweeper shaft 24 by a sprocket chain 33 that runs over a large sprocket wheel 34 on said shaft and a small sprocket wheel 35 on the roll 31.

The leaf disintegrator 29 further includes a row of depending teeth 36 overlying the roll 31. These teeth 36 are integral with and depend from a cover member 37 that forms a rear extension of the cover 10. The cover member 37, at its front longitudinal edge, is integral with a round rod 38 having on its ends trunnions 39 journaled in the casings 9'. Said cover member 37, rearwardly of the teeth 36 thereon, is curved rearwardly and downwardly concentric with the roll 31. The end portions of the cover member 37, outwardly of the teeth 36, normally rest on the upper edge portions of the side frames 9 as stops.

The row of teeth 36 are substantially in a plane that extends radially from the axis of the roll 31, are rectangular in cross-section and the rows of teeth 30 on the roll 31 pass therebetween with a working clearance.

The cover member 37 is yieldingly held on the side frames 9 by a pair of leaf springs 40 secured to end blocks 41 on the cover 10 at its roll 11. These springs 40, at their free end portions, rest on end blocks 42 secured to the cover member 37 at the rod 38. The tension of the springs 40 is sufficient to hold the cover member 37 with its row of teeth 36 in operative position during cutting of leaves, but in case a stick, twig, stone or a hard or tough object is carried by one of the rows of teeth 30 into contact with the row of teeth 36, the pressure on said row of teeth 36 will swing the cover member 37 against the tension of the springs 40, and thereby lift the teeth 36 and allow the object to be carried thereunder by the respective row of teeth 30 without damaging the device or placing undue strain thereon. The inclination of the teeth 36 materially assists in lifting the cover member 37 against the tension of the springs 40 when engaged by an obstruction carried by one of the rows of rotor teeth.

As the device is pushed over a lawn by the handle 14, the leaves thereon are swept forwardly and upwardly by the brushes 20 and carried under the cover 10 and thrown to the disintegrator 29 and cut and broken thereby into fine particles, and then precipitated and redeposited on the lawn.

Referring now in detail to the modification shown in Figs. 6, 7 and 8, wherein the parts that correspond to like parts in Figs. 1 to 5, inclusive, are given the same reference numerals followed by a prime, except the casing 9ᵃ that corresponds to the casing 9'.

The cover member 43 which corresponds to the cover member 37, has its trunnions 44 journaled in the casings 9ᵃ, only one of which is shown. The hinged action 45 of the cover member 43 is of a constant thickness, while the free section thereof is materially reduced in thickness. The row of teeth 46, which corresponds to the teeth 36, are, as shown, each a heavy screw 47 that pass between the teeth 30 with a working clearance. These teeth 46 extend through bores 48 in the thick hinged section 45 of the cover member 43 and are slightly inclined in the direction of the rotation of the roll 31'.

These screws 47 have round heads 49 that rest on the top of the hinged section 45 of the cover member 43 and are slightly countersunk. The screws 47 are rigidly but removably held in the bores 48 by a clamping plate 50 having at its rear longitudinal edge a downturned flange 51 that extends into the aligned nicks 52 in the screw heads 49. The front longitudinal edge of the clamping plate 50 rests on the hinged cover section 45 and is detachably secured thereto by screws 53.

It is well known that dry leaves are brittle and are disintegrated by crushing rather than by cutting and the coarse thread 54 on the screws 47 greatly facilitates disintegration of leaves by crushing as they are fed to the teeth 46 by the rows of rotor teeth 30. The weight of the cover member 43 yieldingly and normally holds said cover member with the teeth 46 in operative positions during the disintegration of leaves, but in case the teeth 46 are engaged by a stick, stone or other hard or tough object carried by one of the rows of teeth 30, the pressure thereof on the teeth 46 will lift the cover member 43 and its teeth 46 and permit the obstruction to pass thereunder. As soon as the obstruction has passed the teeth 46, the weight of the cover member 43 and its teeth 46 will return the same to normal position.

The inclination of the teeth 46 assists in the lifting of the cover member 43 by an obstruction. In case the teeth 46 are broken or their threads 54 badly worn, additional screws 47 may be purchased at any hardware store and the old screw 47 easily removed and new ones substituted therefor.

While the drawings show one embodiment of the invention and a modification thereof, it will be understood that the disintegrator 29 may be installed in various different types of devices for disintegrating leaves.

What I claim is:

1. In a device of the class described, a driven rotor having circumferentially spaced rows of long teeth, the faces of which are smooth and rearwardly inclined, a cover member overlying the rotor and hinged to lift in the opposite direction from the rotation of the rotor and under strain to move toward the rotor, said cover member having a row of depending long teeth spaced forwardly of the hinged portion of the cover member and between which the teeth of the rotor pass, the teeth on the cover member having sharp tearing edges, said cover member being free to be lifted to relieve pressure produced by material being pressed against the teeth on the cover member, by the teeth in one of the rows on the rotor and thereby cause the sharp edges of the teeth on the cover member to lift and tear the engaged material.

2. In a device of the class described, a driven rotor having circumferentially spaced rows of long teeth, a cover member overlying the rotor and hinged to lift in the opposite direction from the rotation of the rotor and under strain to move toward the rotor, said cover member having a row of depending long teeth spaced forwardly of the hinged portion of the cover member and between which the teeth on the rotor pass, the teeth on the cover member having sharp tearing edges, said cover member being free to be lifted to relieve pressure produced by material being pressed against the teeth on the cover member by the teeth in one of the rows on the rotor and thereby cause the sharp edges of the teeth on the cover member to lift and tear the engaged material.

3. In a device of the class described, a driven rotor having circumferentially spaced rows of teeth, a cover member overlying the rotor and hinged to lift in the opposite direction from the rotation of the rotor and under strain to move toward the rotor, a row of teeth in the form of wood screws extending through holes in the cover member forwardly of the hinged portion thereof and between which screws the teeth on the rotor pass, said screws having heads resting on the cover member and provided with aligned nicks, said screws having coarse sharp threads and unthreaded portions in said holes, a plate overlying the heads of the screws, attached to the cover member and having a long flange extending into the nicks in the heads of the screws and holding said screws from turning or lifting relative to the cover member, said cover member being free to lift to relieve pressure produced by material being pressed against the teeth on the cover member by the teeth in one of the rows of teeth on the rotor and thereby cause the threads on the screws to lift and tear the engaged material.

ARVID BJORKLUND.

REFERENCES CITED

The following references are of record in the file of this patent:

UNITED STATES PATENTS

| Number | Name | Date |
|---|---|---|
| 918,285 | Clark | Apr. 13, 1909 |
| 1,857,265 | Stephens | May 10, 1932 |
| 1,883,694 | Goble | Oct. 18, 1932 |
| 1,987,371 | Rudd | Jan. 8, 1935 |
| 2,097,465 | Morrison | Nov. 2, 1937 |
| 2,242,922 | Poynter | May 20, 1941 |
| 2,347,664 | Chilton | May 2, 1944 |